(12) United States Patent
Tan

(10) Patent No.: US 8,959,594 B2
(45) Date of Patent: Feb. 17, 2015

(54) SYSTEMS AND METHODS FOR COLLECTING AND ACCRUING LABOR ACTIVITY DATA UNDER MANY-TO-MANY EMPLOYMENT RELATION AND WITH DISTRIBUTED ACCESS

(71) Applicant: Washington State University, Pullman, WA (US)

(72) Inventor: Li Tan, Richland, WA (US)

(73) Assignee: Washington State University, Pullman, WA (US)

( * ) Notice: Subject to any disclaimer, the term of this patent is extended or adjusted under 35 U.S.C. 154(b) by 0 days.

(21) Appl. No.: 13/751,410

(22) Filed: Jan. 28, 2013

(65) Prior Publication Data

US 2014/0215570 A1 Jul. 31, 2014

(51) Int. Cl.
*G06F 7/04* (2006.01)
*G06Q 40/00* (2012.01)
*H04L 29/06* (2006.01)

(52) U.S. Cl.
CPC .............. *G06Q 40/125* (2013.01); *H04L 63/08* (2013.01)
USPC ............................................................ 726/4

(58) Field of Classification Search
CPC ............................ H04L 63/08; G06F 21/6218
USPC ........................................................ 726/2, 4
See application file for complete search history.

(56) References Cited

U.S. PATENT DOCUMENTS

| | | | |
|---|---|---|---|
| 6,591,242 B1* | 7/2003 | Karp et al. ..................... | 705/2 |
| 7,941,351 B1* | 5/2011 | Rosenfeld et al. ............. | 705/30 |
| 2004/0158563 A1* | 8/2004 | Pawlowski et al. ............ | 707/10 |
| 2011/0202459 A1* | 8/2011 | Shah et al. ..................... | 705/44 |

OTHER PUBLICATIONS

Ampatzidis et al, WSU Cherry Field Day, Jun. 8, 2011, p. 12.
Ampatzidis et al, WSU-LAREC Cherry Field Day, Jun. 4, 2012, p. 8.
Ampatzidis et al, "Simulation of Bin Loading Process During Manual Harvest of Specialty Crops Using the Machine Repair Model", Sep. 8, 2012 p. 317.

(Continued)

*Primary Examiner* — Anthony Brown
(74) *Attorney, Agent, or Firm* — Whitham Curtis Christofferson & Cook, PC

(57) ABSTRACT

A system and methods enable distributed users to have controlled and distributed access to labor data, and the labor data are produced as the results of monitoring and accruing labor activities with many-to-many employment relation. One method further comprises: (1) a method of importing data as the result of monitoring labor activities, and resolving the employment relation under which a labor activity is performed; (2) a method of accruing labor activities using input data according to the employment relation identified by method (1), and; (3) a method of enabling controlled access to labor and payroll data for distributed users. Labor monitoring software system (a) accrues labor activities from field-collected labor monitoring data, (b) identifies the employment relation, and (c) prepares payroll report based on the terms defined in the employment relation. Authorized users may access the data in raw or processed format from a variety of Internet-connected devices, including smartphones, tablets, and desktop computers. The system may be used in a variety of applications in which an employee has multiple employers, and distributed access to labor data is needed.

25 Claims, 6 Drawing Sheets

(56) References Cited

OTHER PUBLICATIONS

Ampatzidis et al, "Comparing the Efficiency of Future Harvest Technologies for Sweet Cherry", Apr. 1, 2012, p. 195-198.

Ampatzidis et al, "A Wearable Module for Recording Worker Position in Orchards", Jul. 28, 2011, p. 222-230.

Ampatzidis et al, "A Novel System for Monitoring Labor Efficiency During Manual Harvest of Specialty Crops", Mar. 30, 2012, p. 1.

* cited by examiner

SYSTEMS AND METHODS FOR COLLECTING AND ACCRUING LABOR ACTIVITY DATA UNDER MANY-TO-MANY EMPLOYMENT RELATION AND WITH DISTRIBUTED ACCESS

This invention was made with funding support from the United States Department of Agriculture under Grant No. 2011-31100-06053. The U.S. government has certain rights in the invention.

BACKGROUND OF THE INVENTION

1. Field of the Invention

The present invention generally relates to methods and systems for collecting and accruing labor activity data under many-to-many employment relation and with distributed access. More particularly, this invention falls into the general domain of labor monitoring and payroll accounting, in which an employee's pay is quantitatively related to labor activity performed by the employee under an employment relation.

2. Background Description

Many-to-many employment relation refers to the situation in which an employee may have multiple employers, and an employer may hire more than employee at a time. Many-to-many employment relation exists in many industrial sectors, especially in industries where short-term employment with seasonal workers is a prevailing labor practice. A representative example is agricultural industry, in which seasonal workers and immigration workers move swiftly from one field operation to another. These workers may work for more than one employer concurrently. Labor activities have to be accrued according to employment under which these activities take place. The question is how to efficiently and effectively identify the employment under which a labor activity takes place. Currently, the prevailing practice is to collect and accrue data on a per employer basis. Each employer operates his own system to monitor labor activities in his field operation. For an application in which the employment relation is reasonably stable and the majority number of employees hold just one job at a time, the cost of operating a labor monitoring system for each employer may be justified. However, under a many-to-many employment relation, individually operated monitoring systems induce extra overhead and prevent further integration of labor information.

For example, consider an employee, John, who works for multiple farms concurrently. During a cherry-pick season, he spends mornings of work days alternatively in two cherry orchards to pick up fruits, and in the afternoon, he prunes trees in an apple orchard. If each orchard runs its own labor data collection and accruing system, John needs to register with each individual farm. Not only is the process is unnecessary, it is also error-prone. What if John's information is entered incorrectly during one of these registrations? Moreover, because John is presented as an individual entity in each system, each employer has to independently verify his information, including work eligibility, which is a big issue in agricultural operations in the United States.

What is needed are methods that enable the consolidation of individually operated labor monitoring systems. A key challenge in the consolidation is how to accurately identify the employment relation under which a labor activity takes place.

Another challenge in consolidating labor monitoring systems is to provide distributed and controlled access to labor data. With recent advances in Internet technology, especially in portable personal computing devices such as tablets and smartphones, there is an increasing need to access labor data anywhere, any time, and on any device.

SUMMARY OF THE INVENTION

It is therefore an object of the present invention to provide systems and methods that enable efficient and effective identification of employment relationships for labor data. The system and methods presented in this invention address two challenges in building a consolidated labor monitoring system: (1) how to efficiently and effectively identify an employment relation to which the labor data and its underlying labor activities are related; and (2) how to enable the distributed access to labor data, and ensure that only the people involving an employment relation or their trusted agents may have the access to the labor data incurred under an employment.

The invention depicts a system that enables distributed access to labor data. The labor data is consolidated using the methods also described in this invention. The system depicted in this invention comprise a cluster of servers. One embodiment of this system is implemented using a cloud computing platform, in which clusters of servers are provided as services. In this embodiment of the system, a variety of Internet-connected devices such as tablets, smartphones, and laptops may access labor data using standard Internet protocols.

More particularly, in one embodiment of the invention, systems and methods are provided for monitoring and accruing labor activities under many-to-many employment relation and with distributed access. The many-to-many employment relation refers to a group of people related by employment, in which an employee may have more than one employer, and one employer may have more than one employee. In such a many-to-many employment relation, an employee may have concurrent employment with multiple employers, and hence the actual employment which incurs a labor activity may not be easily decided based solely on the timing of the labor activity. This invention provides methods to address challenges in accruing labor activities under many-to-many employment relation and with distributed access. Specifically, the invention provides a method that can identify the employment relation that incurs a labor activity, and a method that can provide the distributed access to the labor data for authorized users in context of a many-to-many employment relation.

According to an embodiment of this invention, the system may comprise one or more servers configured to register users. Employers, employees, and their trusted agents may register with the system. The roles of an employer, an employee, and an agent may be overlapped. Each user is assigned with a unique Global Identification Number (GID). A user account may also contain other necessary information to facilitate the extended functionalities, for example, an immigration status record used to verify the work eligibility of an employee.

The system comprises one or more servers configured to communicate with Labor Monitoring Devices (LMDs). A LMD is uniquely identified within the system by its device identification record (DIR). A labor monitoring device refers to any device with the following three functions: (1) measuring labor activities; (2) acquiring a local identification record from an employee; and (3) sending the labor data, the Local Identification Records (LIR), and the DIR of the device to a system server. A feature of this invention is that it can work with a variety of labor monitoring devices, as long as they can possess the aforementioned three functions. The actual measurement of labor activity depends on applications and the configuration of the labor monitoring device, and is not in the scope of this invention.

The device identification record (DIR) of a LMD is the data that can uniquely identify the LMD within the system. The form of a DIR depends on an actual embodiment of the invention. In one embodiment of this invention, the DIR is a sequence of the digits associated with the labor monitoring device. In another embodiment of this invention, the DIR is a reference to the device's geological location.

When an employee starts to work for an employer, the employer will assign to the employee one or more Local Identification Records (LIR). The forms of the LIR depend on the actual embodiments of the invention. In one embodiment of this invention, the LIR is a sequence of the digits that is assigned to an employee. The employee enters the LIR to a Labor Monitoring Device before or during a labor activity. In another embodiment of this invention, the LIR is a digital record embedded on a device, which is referred to as Personal Identification Device (PID) in the description of this invention. For example, a digital code carried by a Radio Frequency Identification device (RFID). The RFID transmits the digital code to a Labor Monitoring Device before or during a labor activity. Yet in a third embodiment of this invention, the LIR is a function of the physical and/or logical characteristics of the employee. For example, biometrics including fingerprints, palm-prints, etc. Before or during a labor activity, a Labor Monitoring Device uses a biometric reader to measures a biometric of an employee, and use the biometric data to compute the LIR.

At the onset of an employment relation R, the employer registers with the system the employment relation R. The employer associate the employment relation with a pair $\langle D_R, L_R \rangle$, where $D_R$ is the subset of the DIRs of LMDs operated by the employer, and $L_R$ is a subset of the LIRs assigned to the employee being involved in the employment relation. The system checks and enforces the following invariant: there are not two pairs $\langle D_R, L_R \rangle$ and $\langle D_{R'}, L_{R'} \rangle$ such that $D_R \cap D_{R'} \neq \emptyset$ and $L_R \cap L_{R'} \neq \emptyset$. This invariant guarantees that, for any pair of a LIR l and a DIR d, there is at most one registered pair $\langle D, L \rangle$ such that l∈L and d∈D.

The employment relation registered by an employer for one of his employees may bear other additional information that facilitates payroll computation and other functions of the system. For instance, the relation may contain the information on the employee's pay rate.

The system receives from a LMD its DIR d, a LIR l acquired from an employee whom the LMD is monitoring, and the labor data as a measurement of the employee's labor activities. The system checks $\langle d, l \rangle$ on the registered pairs of DIRs and LIRs. If the system finds a $\langle D_R, L_R \rangle$ such that d ∈ $D_R$ and l ∈ $L_R$, the system associates the labor data with the employment relation R. The system accrues labor data and prepares payroll reports using the payroll information of R.

The system provides authorized users the distributed and controlled access to labor data. The system stores a set of employment-relation-based access rules that define a user's access capability to labor data based on his role in the employment relation related to the labor data. Mathematically these access rules are a predicate over users and employment relations. A user can access the labor data associated with an employment relation only if the value of the predicate over the user and the employment relation is true. Depending on the actual application of the present invention, an employer and his trusted agents involving in an employment relation may have the access to the related labor data and the payroll reports generated from these data. The employer and his trusted agents may also modify these access rules as needed. Additional non-employment relation-based access rules may also be added to the system to accommodate the data access need of a particular application.

The labor data and the payroll reports may be delivered to a variety of network-connected computing devices, including computers, mobile devices, etc. To view a payroll report, a user needs to log onto the system. After the system validates the user's access to a payroll report using the access rules, the system will deliver the payroll report to the user's device.

The system comprises one or more databases and servers. These databases store the persistent information such as the employment relation and user account information. The system also comprises one or more web servers, which provide the access to the system for network-connected devices. Notwithstanding, the roles of the aforementioned servers may be overlapped. For example, a web server may host a database and hence act as a database server as well.

Virtually any means of labor activities may be associated with the system. The measurement of these labor activities may include work hours, the quantity and quality of the products, and other metrics used to measure the productivity of labor activities.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION THE INVENTION

Figure 1:
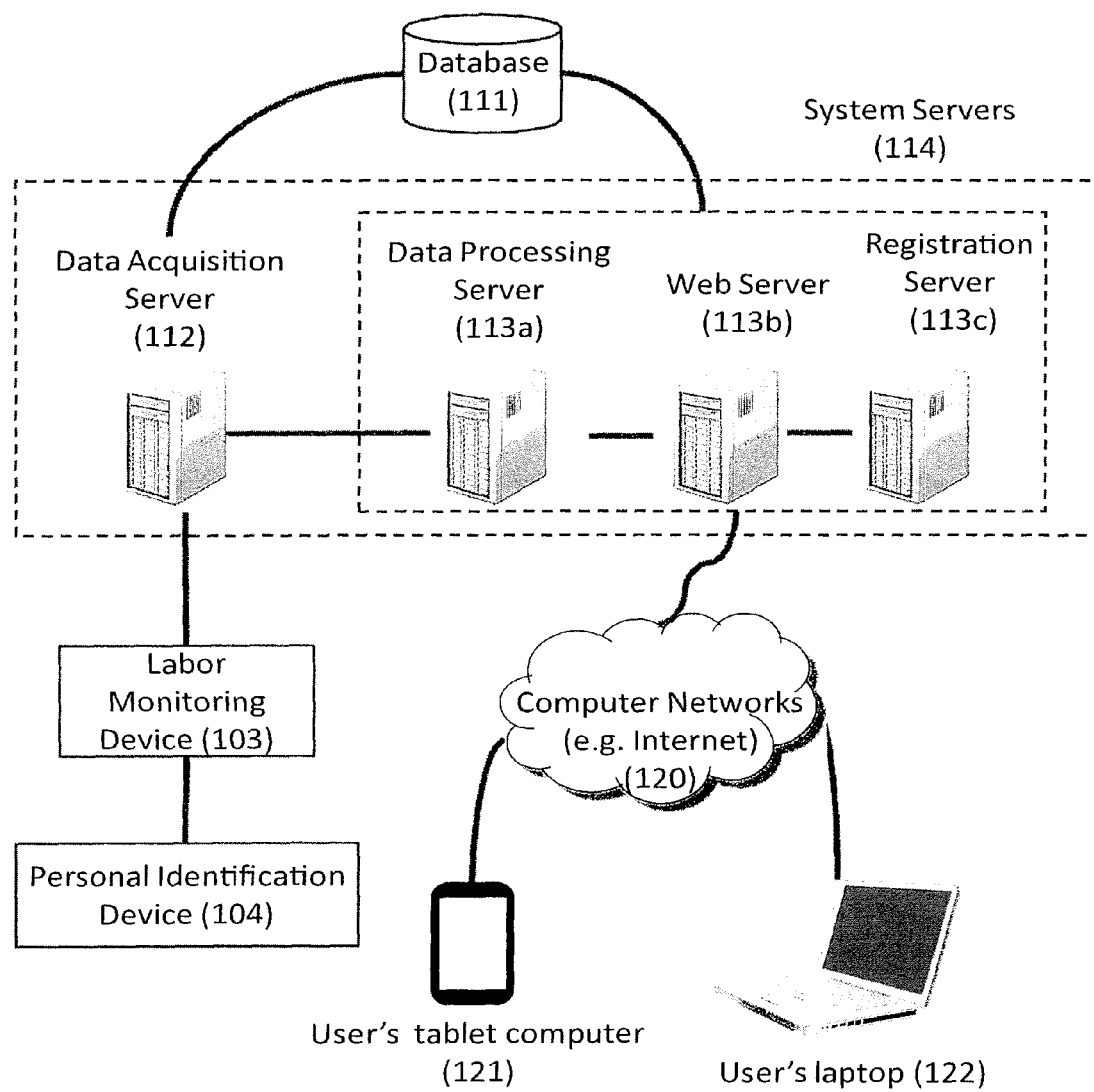
FIG. 1 is a block diagram depicting a system for collecting and accruing labor activity data under many-to-many employment relation and with distributed access, in accordance with an embodiment of the present invention.

The following description is presented to enable any person having ordinary skill in the art to make and use the invention, and is provided in the context of particular applications of the invention and their requirements. Various modification to the disclosed embodiments will be readily apparent to those having ordinary skill in the art and the general principles defined herein may be applied to other embodiments and applications without departing from the spirit and scope of the present invention. Thus, the present invention is not intended to be limited to the embodiments shown, but is to be accorded in the widest scope consistent with the principles and features disclosed herein.

The illustrations of executions of an embodiment of the current invention incorporate general-purpose computers as well as special purpose digital devices such as smartphones. Details of such devices (e.g. processor, memory, data storage, display, camera, wired/wireless communication capability) are omitted for the sake of clarity.

It should also be understood that the system and methods of the present invention might be implemented using variety of technologies. For example, the methods described herein may be implemented as software program on a computer, or as a hardware circuit, or various combination of hardware and software. In particular, the methods described herein may be implemented by a series of computer instructions residing on a storage medium such as disk drives and other computer readable medium. The methods may use a variety of communication media that facilitate information exchange between components (e.g. system servers and client computing devices) of an embodiment of the present convention. Examples of communication media includes cellular data networks, Ethernet networks, and IEEE 802.11 networks (i.e., WiFi).

In one embodiment of this invention a system and methods are provided to enable the collection, accrual, and distributed access of labor activities data under many-to-many employment relations. A labor activity being accrued may be measured by its length, the quantity and quality of products and services as direct or indirect consequence of the labor activity, or other metrics, as long as these metrics are acceptable to the employment relation under which the labor activity takes place.

Client computing devices may be used by a user to access labor data through a communication media, in accordance with an embodiment of the present invention. A client computing device may or may not be portable in nature, and may deploy virtually any communication media, including both wired and wireless. Examples of client computing device include Personal Computer (PC), Personal Data Assistants (PDA), smart-phones, and other digital handheld devices.

In one embodiment of this invention, the system acquires labor data from a Labor Monitoring Device (LMD). The labor data may be transmitted on a temporary connection or a permanent one, or on a physical media that is capable of carrying data from the LMD to the system server, such as a storage card.

In the present invention, a Labor Monitoring Device (LMD) is used to measure labor activities and transmit the labor data to a system server. Any physical device may be used as a LMD, provided that the device can provide the following three functions: (1) measuring labor activities as required in its application; (2) acquiring a local identification record (LIR) from an employee; and (3) sending the labor data, the Local Identification Record (LIR), and the Device Identification Record (DIR) of the device to a system server. DIR and LIR are data records used for identifying a LMD and an employment relation, respectively. Their definitions and details will be introduced shortly in the description. Examples of a measurement of a labor activity include the length of a labor activity, the quantity of products being produced, and the quality of these products, etc.

In the present invention, the system uses a set of employment-relation-based access rules to decide whether a user has access to a set of labor data and their derived payroll reports. Mathematically these access rules are a predicate over users and employment relations. A user has the access to a set of labor data, only if the value of the predicate over this user and the employment relation associated with the labor data is true. For example, consider an application of the present invention wherein the access rules are modeled by the predicate P(user; relation). User Bob has access to the labor data d, if P(Bob; R(d))=true, where R(d) is the employment relation associated with d. Bob has access to a payroll report r, if $\hat{}_{b \in B(r)} P(Bob; R(d))$=true, where B(r) is the set of labor data used for generating the payroll report r. That is, Bob has access to r, if he has access to all the labor data used for generating r. Employment-relation-based access rules may contain additional parameters and non-employment-relation-based access rules may be added to the system, to accommodate the data access needs of different applications of the present invention.

Referring now to the drawings, and more particularly to FIG. 1, there is shown a labor monitoring and payroll accounting (LMPA) system for collecting and accruing labor activity data under many-to-many employment relation and with distributed access.

The system comprises a plurality of servers 114 connected to a common database 111. The connection may be either direct, through a local area network (LAN) or via the Internet. Database 111 serves as a persistent data storage which stores users' account information and other data that are persistent across different sessions and transactions, in accordance with the methods defined in the present invention. User information may include user identification, contact information (e.g., name, email address), and other employment-related information. In an embodiment of the present invention, a user is identified by a system-wide unique Global Identification number (GID). Database 111 may be implemented using different forms and technologies, for example, using a centralized architecture design or a distributed design where the data is partitioned and distributed into multiple networked computers to improve performance.

The system is configured to register users. The first of the servers is a data acquisition server 112 which receives information from a labor monitoring device 103. This information includes personal identification provided by a personal identification device 104. The second of the servers illustrated in FIG. 1 is a data processing server 113a which accesses the database 111 to store labor data with global identification numbers GIDS of the employee and employer. The third server illustrated in FIG. 1 is a Web server 113b which accesses database 111 to retrieve the labor data. The fourth server is a registration server 113c registers users and associates the users with various records such as the records of employment relations, data access rules etc, in accordance with methods of the present invention. More particularly, registration server 113c receives registration data, stores it in database 111, and when requested, data is accessed from the database 111 by a user having access privileges. While FIG. 1 illustrates three servers 113a, 113b and 113c, those skilled in the art will understand that more than three servers may be used in a system implemented in accordance with the invention and that the functions of the servers may overlap; that is, the functions of the Web server 113a may be performed by the data processing server 113b and/or the functions of the data processing server 113a may be performed by the registration server 113c and vice versa.

The Web server 113b is connected to computer networks 120, which may include local area networks (LANs) and the Internet, that provide access to the Web server 113b. It is through these computer networks that various devices such as smartphones, tablet computers, laptop computers, and desktop computers may have access to the Web server 113b and thence to the data stored in database 111. FIG. 1 shows for illustrative purposes only a tablet computer 121 and a laptop computer 122, but this illustration is not to be construed as a limitation to the practice of the invention. That is, users deploy various computing devices to access the system, in accordance with methods of the present invention. Virtually any computing device with any plurality of processors and a storage storing instruction may be used.

An Embodiment of a System for Collecting and Accruing Labor Activity Data under Many-to-Many Employment Relation and with Distributed Access FIG. 1 depicts a system for facilitating the collection and accrual of labor data under many-to-many employment relation and with distributed access, in accordance with an embodiment of the present invention. Alternative embodiments of the invention may incorporate any subset of the components of the illustrated system.

Data acquisition server 112 serve as the communication interface to labor monitoring devices (LMDs) 103. The labor data and other identification records sent by a labor monitoring device are received by the data acquisition server 112 and pre-processed to remove errors. The connection between a data acquisition server 112 and a labor monitoring device 103 may be implemented using various communication technologies, e.g., Ehternet, Fiber Optical Channel, or portable storage media etc.

Data processing server 113a processes labor data and generate payroll reports. The generation of a payroll report may be driven by a user's request, or when the labor data used in the report is updated. Web server 113b serves as a web portal. They are connected with a variety of client computing devices such as tablet computer 121 or laptop 122 through Computer Networks 120. Web servers deliver payroll reports and various views of labor data to authorized users. Registration server 113c registers users and associates the users with various records such as the records of employment relations, data access rules etc, in accordance with methods of the present invention.

Database 111 serve as a persistent data storage. They store user's account information and other data that are persistent across different sessions and transactions, in accordance with the methods defined in the present invention. User information may include user identification, contact information (e.g., name, email address), and other employment-related information. In an embodiment of the present invention, a user is identified by a system-wide unique Global Identification number (GID). Database 111 may be implemented using different fauns and technologies, for example, using a centralized architecture design or a distributed design where the data is partitioned and distributed into multiple networked computers to improve performance.

In this embodiment of the system of FIG. 1, users deploy various computing devices to access the system, in accordance with methods of the present invention. Virtually any computing device with any plurality of processors and a storage storing instruction may be used. The illustrative system FIG. 1 lists some examples, including a tablet computer 121 and a laptop 122.

Figure 2:
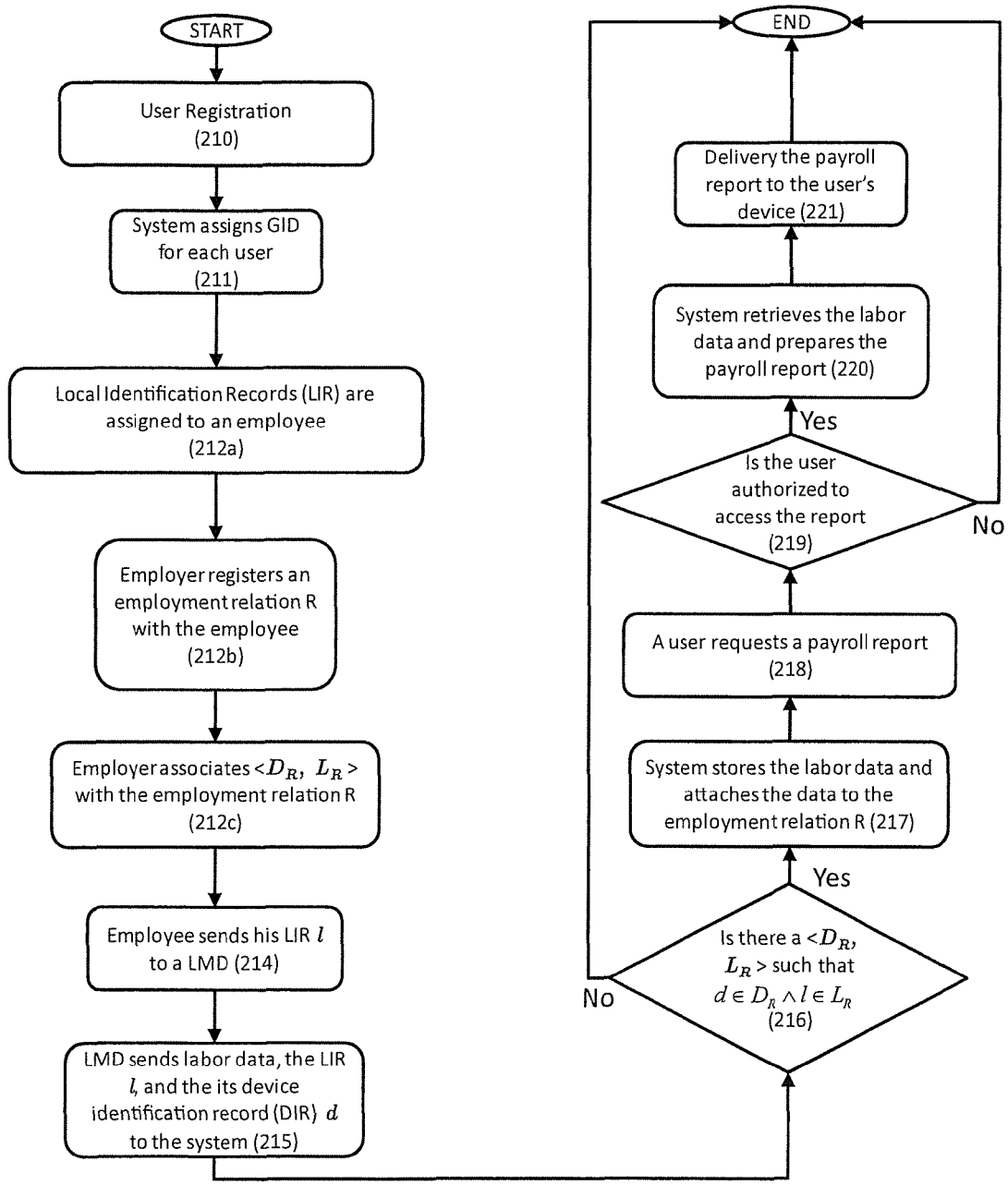
FIG. 2 is a flow diagram depicting one method of collecting and accruing labor activity data, and enabling distributed access, in accordance with an embodiment of the present invention.

One Method of Collecting and Accruing Labor Activity Data under Many-to-Many Employment Relation and with Distributed Access With reference now to FIG. 2, a workflow diagram illustrating a method of collecting and accruing labor activity data according to one embodiment of the present invention. The illustrated method is suitable for use with the system depicted in FIG. 1.

First, users need to register with the system at step 210. Registration processes may be carried out concurrently by users. In what follows, a registered user is referred to simply as a user for brevity and clarity, unless noted otherwise.

In one method of the present invention, the system assigns to each registered user an unique Global Identification number (GID) at step 211. A user is referred to by his GID within the system. Before an employee starts to work for an employer, one or more local identification records (LIRs) are assigned to the employee at step 212a. For each employment relation R that the employee has with the employer, the employer registers the employment relation R at step 212b. The employer then associates with R a pair of DIRs and LIRs $\langle D_R, L_R \rangle$ at step 212c. $D_R$ is a set of Device Identification Records (DIRs) of Labor Monitoring Devices (LMDs) that the employer is operating or permitted to use, and $L_R$ is a subset of LIRs assigned to the employee. The employee is communicated on the practical usage of his LIRs. For instance, the employee is told that a particular LIR, when used with a particular LMD, will indicate that he is working under a particular employment relation.

After the registration processes is done, LMDs are deployed to monitor labor activities. Before or during a labor activity, an employee sends his LIR l to a LMD at step 214. If an employee has more than one LIRs, the LIR being sent is the one associated with the employment relation under which the labor activity takes place. The LMD measures the labor activity. It sends the labor data, the LIR l obtained from the employee, and its own DIR d to the system at step 215.

Once the system receives the labor data, l, and d, the system checks whether there is a pair of DIRs and LIRs $\langle D_R, L_R \rangle$ such that $l \in L_R$ and $d \in D_R$ at decision block 216. If such pair is found, the system associates the labor data with the employment relation R at step 217; otherwise, the process ends.

A user may request to access a payroll report at step 218. The system checks the user's access privilege to the payroll report using employment-relation-based access rules as described in the introduction section of this description. If the access to the payroll report is granted at decision block 219, the system retrieves the labor data and prepares the payroll report at step 220. It then delivers the report to the user's client computing device at step 221.

Figure 3:
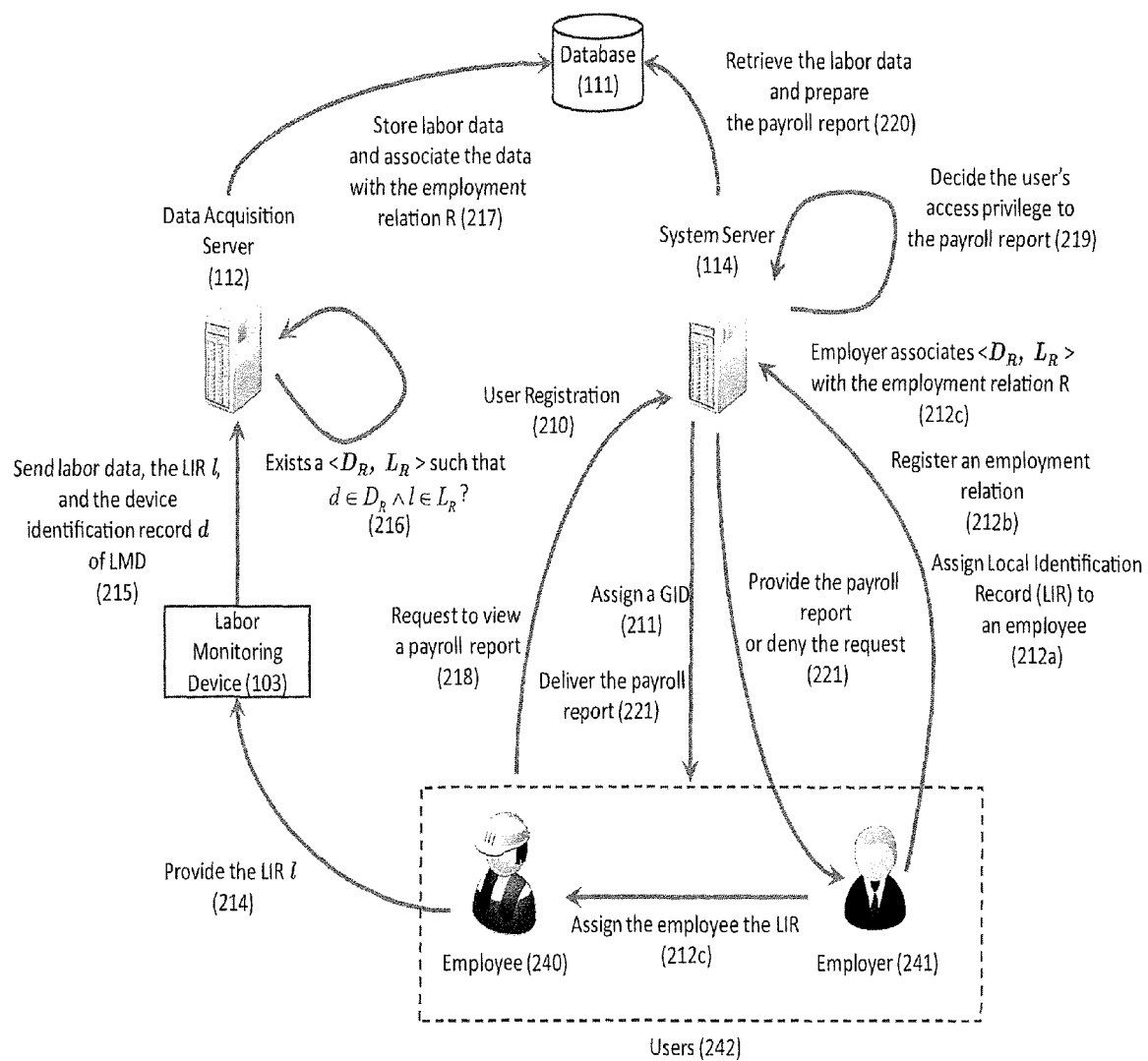
FIG. 3 depicts one form of conducting the method depicted in FIG. 2 using the system depicted in FIG. 1, in accordance with an embodiment of the present invention.
Figure 4:
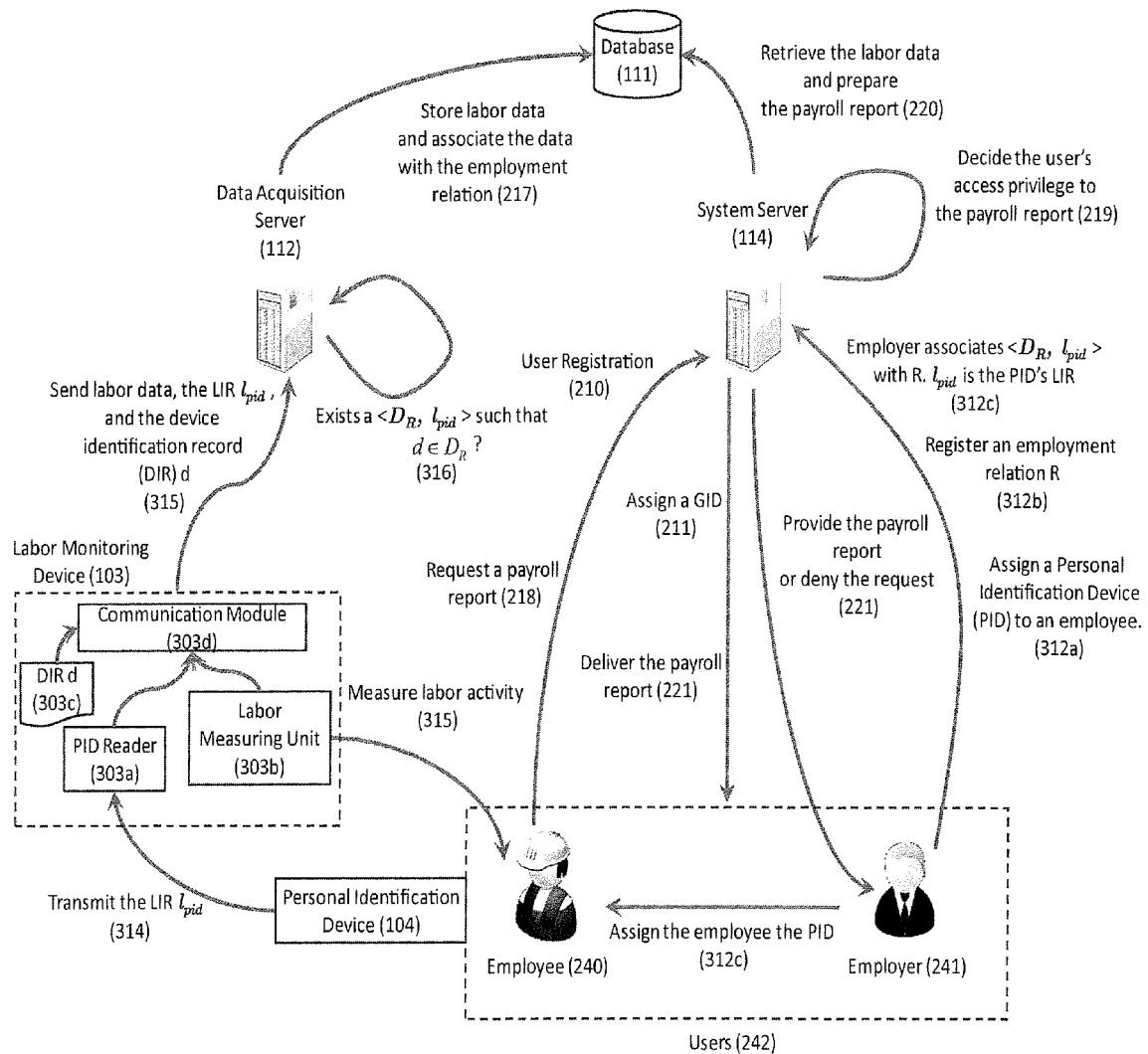
FIG. 4 depicts one form of conducting the method depicted in FIG. 2 wherein a Personal Identification Device (PID) is used to store and transmit a Personal Identification Record (PIR), in accordance with an embodiment of the present invention.

FIG. 2 illustrates the workflow of a method depicted in the present invention, in accordance with an embodiment of the present invention. The workflow in FIG. 2 forms the basis for other forms and extensions of the method depicted in the present invention. FIG. 3 depicts a basic form of the method that collects and accrues labor activity data using the workflow depicted in FIG. 2 and the embodiment depicted in FIG. 1. FIG. 4 extends the form of the method in FIG. 2 with the usage of Personal Identification Device (PID). A PID is a physical device that carries a LIR and transmits the LIR to a LMD.

It should be noted that additional steps and hardware may be used in conjunction with the methods hereof. Such extension and combination will be readily apparent to those having ordinary skill in the art and the general principles defined herein may be applied to other methods and embodiments without departing from the spirit and scope of the present invention. Thus, the present invention is not intended to be limited to the methods and embodiments shown, but is to be accorded in the widest scope consistent with the principles and features disclosed herein.

Collecting and Accruing Labor Activity Data wherein the Local Identification Record (LIR) is Stored in and Transmitted by a Personal Identification Device (PID)

With reference now to FIG. 4, illustrating a form of the method collecting and accruing labor activity data wherein the local identification record (LIR) is stored in and transmitted by a personal identification device (PID). This method extends the method of FIG. 3 with steps and means that enable an employee to use the PID to transmit the LIR to a Labor Monitoring Device (LMD). For brevity and clarity, this description will emphasize on these additional steps and means.

In the method of FIG. 2, a local identification record (LIR) is created to uniquely identify an employment relation for a given employer. In the form of the method depicted by FIG. 4 the LIR is stored in a personal identification device (PID). Instead of assigning a LIR to an employee (212a, in FIG. 3), an employer assigns a PID to the employee 312a. Each PID carries its own LIR $l_{pid}$. $l_{pid}$ is used in lieu of a LIR directly assigned to the employee 312c. Instead of entering a LIR to a LMD (214, in FIG. 2), the employee uses the PID to transmit the LIR to the LMD 314.

A PID can be virtually any device that is capable of storing or generating a digital record, and transmitting it in a format acceptable for a LMD. The examples of a PID include Radio Frequency Identification devices (RFID) in various wearable forms, for instance, RFID-embedded wristbands and badges. A PID may further incorporate encryption apparatus to encrypt a LIR, which is decrypted by the system.

FIG. 4 also shows the details of a form of a Labor Monitoring Device (LMD) used with a PID. The LMD comprises: (i) a PID reader 303a that reads a LTR from a PID; (ii) a labor activity unit 303b to measure labor activities; (iii) a communication module 303d that can transfer labor measurement data, LIR, and Device Identification Record (DIR) 303c to a system server. The DIR may be encoded in hardware logic, or software program, or the combination of both. For clarity, this description separates the components of the LMD based on their functions. Notwithstanding, the components may be overlapped and co-located on the same hardware logic and/or software program. For instance, the communication module and the PID reader may share the same communication unit, if the communication with the system server and the PID are carried on a similar media.

Figure 5:
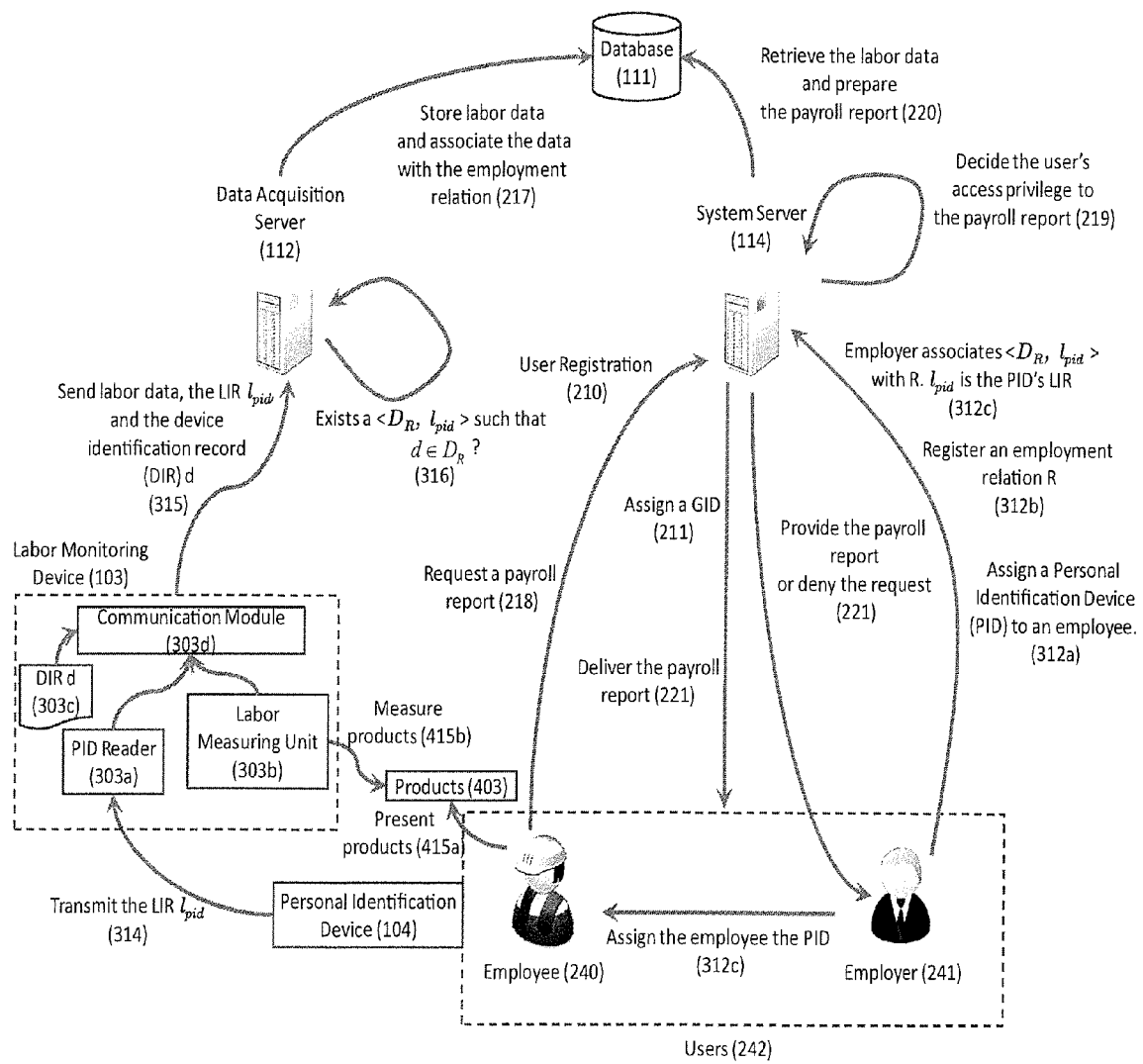
FIG. 5 depicts one form of conducting the method depicted in FIG. 2 wherein a Personal Identification Device (PID) is used and labor activities are measured by the products being produced, in accordance with an embodiment of the present invention.

Collecting and Accruing Labor Activity Data wherein the Personal Identification Device (PID) is Used and Labor Activities are Measured by the Products being Produced With reference now to FIG. 5, illustrating a form of the method collecting and accruing labor activity data wherein a PID is used and labor activities are measured by the products being produced. This method extends the method of FIG. 4 with steps and means that enable the measurement of the products being produced by an employee's labor activities. For brevity and clarity, this description will emphasize on these additional steps and means.

In this form of the method, labor activities are measured by the quantity and quality of products being produced. The scope of a LMD is further refined to a device that can measure the quantity and quality of these products. In this form of the method, an employee presents to a LMD the products as the result of his labor activity 415a. The LMD then measures the products 415b, and then send to the system the labor measurement data, as well as the device's DIR and the LIR from the PID 415c. The steps 415a, 415b, and 415c can be repeated as many times as needed in the duration of labor activities. Before the step 415c, the employee also uses a PID to transmit the LIR to the LMD 314.

Figure 6:
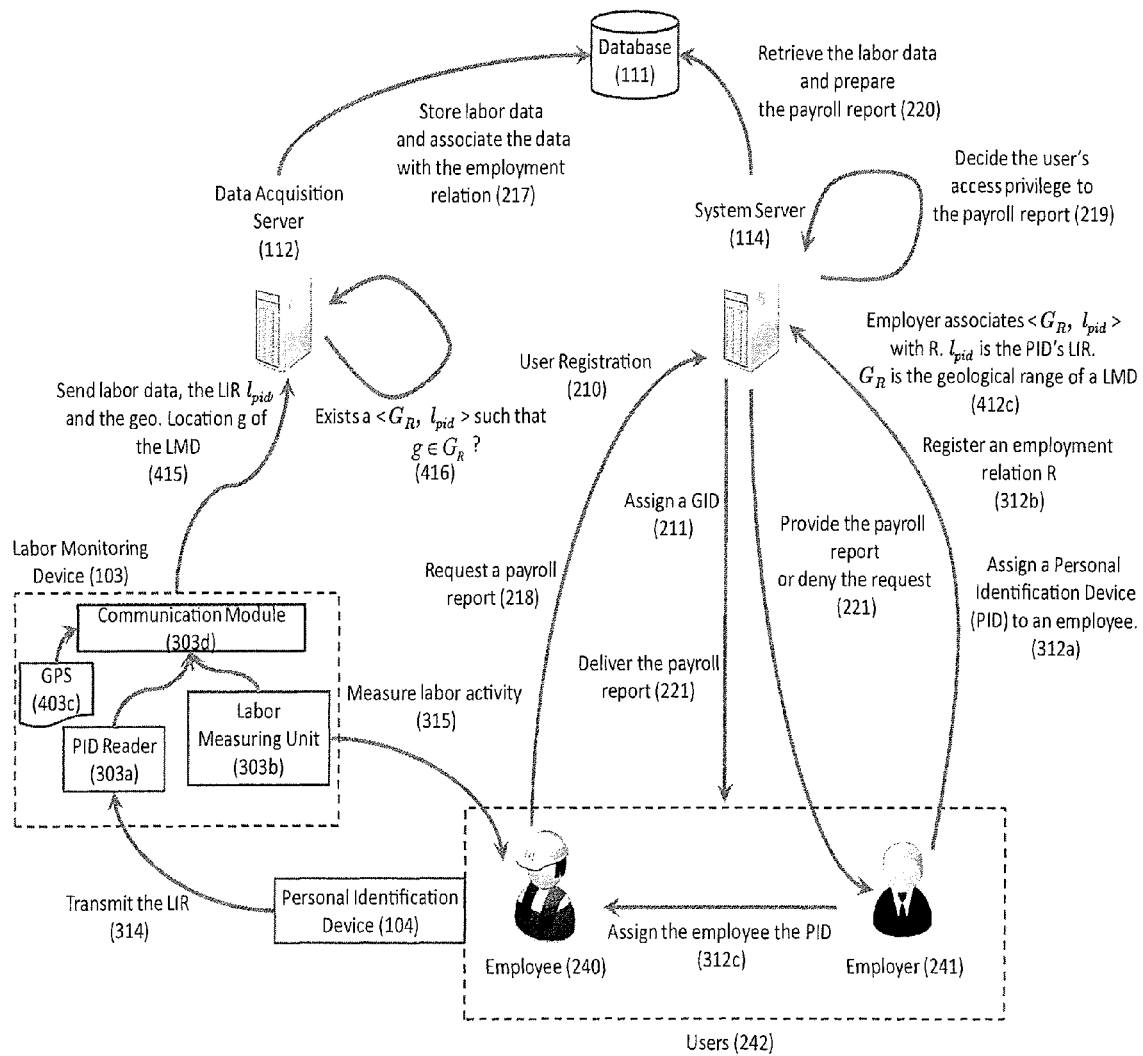
FIG. 6 depicts one form of conducting the method depicted in FIG. 2 wherein a Labor Monitoring Device (LMD) uses its geological location as its Device Identification Record (DIR), in accordance with an embodiment of the present invention.

Collecting and Accruing Labor Activity Data wherein the Device Identification Record (DIR) is its Geological Location With reference now to FIG. 6, illustrating a form of the method collecting and accruing labor activity data wherein the Device Identification Record (DIR) of a Labor Monitoring Device (LMD) is the LMD's geological location. This method extends the method of FIG. 3 with steps and means that enable a LMD to use its geological location as its Device Identification Record (DIR). For brevity and clarity, this description will emphasize on these additional steps and means.

In this form of the method, the DIR of a LMD is instantiated as the LMD's geological location. An employer registers the geological range of the LMD 513. Mathematically the geological range of a LMD is a set of geological locations. The set of geological location may be represented as a set of points, 2-D polygons, and other geometric shapes of two or more dimensions, depending on the extent of geological space used in the application of the present invention. In an embodiment of the present invention, the geological range of a LMD is the set of polygons representing the geological boundary of farming fields. A LMD contains necessary hardware and software that can compute its geological location. For example, the LMD may contain a Global Positioning System (GPS) device 403c that can compute its geological location using the signals received from a space-based satellite navigation system.

In this form of the method, a LMD sends to the system its geological location g as its DIR, along with the labor data and the LIR $l_{pid}$ received from the employee's PID 415. The system checks if there exists a pair of a set of geological locations and a LIP. $\langle G_R, l_{pid} \rangle$ such that identifies the LMD's operator by checking whether $g \in G_R$ 416. If such a pair is found, the system attaches the labor data to the employment relation R that has been associated with $\langle G_R, l_{pid} \rangle$ by the employer 412c.

Note on Use Cases of LMDs

Case 1:

Migrant worker José works for Fred's apple Orchard on two positions. Jose may work as an office assistant for Fred, or as a fruit picker. Before José starts with Fred's Orchard, Fred assigns a Personal Identification Device (PID) (104, FIG. 4). The PID is an RFID-embedded wristband. Fred then registers two employment relations for José (312b, FIG. 4). The RFID of the wristband is José's Local Identification Record.

In the employment relation for José's office assistant position, Fred associates with this relation a pair of $\langle d_{office}, RFID \rangle$, where $d_{office}$ is the device identification record (DIR) of the Labor Monitoring Device 103 located in Fred's office. The LMD at office consists of the following components: a RFID reader; a clock; and a DIR $d_{office}$. The DIR $d_{office}$ is a digital sequence uniquely identifying the LMD in the system. When José works as an office assistant, he simply waves his RFID-embedded wristband before the LMD at the office. The LMD measures José's activity by computing the time lapse between clock-in and clock-out (315, FIG. 4). The LMD then sends the labor data (i.e., the time lapse), the RFID, and its DIR $d_{office}$ to a data acquisition server (315, FIG. 4). Once the data is received, the system finds the pair $\langle d_{office}, RFID \rangle$ and the employment relation associated with the pair (316, FIG. 4). The system then attaches the labor data with the employment relation for José's office assistant position 217.

In the employment relation for Jose's fruit picker position, Fred associates with this relation a pair of $\langle G, RFID \rangle$ (412c, FIG. 6), where G is the geological location of the LMDs in the orchard. A LMD in the orchard consists of the following components: a RFID reader; a scale; and a Global Positioning System device (GPS). When José works as a fruit picker, he waves his RFID-embedded wristband before the LMD, and puts onto the scale the bucket of the fruits he just picked. The LMD measures Jose's activity by the weight of the fruits he picked (315, FIG. 6). The LMD then sends the labor data (i.e., the weight of fruits), the RFID, and its GPS location g to a data acquisition server (415, FIG. 6). Once the data is received, the system finds the pair (G,RFID) such that g ∈ G (416, FIG. 6). The system then attaches the labor data with the employment relation for José's fruit picker's position 217.

Case 2:

John is an assembly line worker. His assignment is to assemble a component C. Once a component C is assembled, John puts it in a RFID-tagged container. The container then passes through a labor monitoring device (LMD) to the next stage of assembly. Before John starts, he is assigned with a dozen RFID-tagged containers. A trusted agent of his employer has registered $\langle D_R, RFID_R \rangle$ with John's employment relation. $RFID_R$ is the set of RFID tags on the containers assigned to John, and $D_R$ is the set of all the device identification numbers of all the LMDs being deployed on the assembly line. A labor monitoring device comprises the following components: a RFID reader, a clock, and a DIR id. Every time when a container passes a LMD (415 a, b, FIG. 5), the LMD sends the labor data (i.e. the current time), the RFID id of the container, and d to a data acquisition server (315, FIG. 5). Once the system receives the data, it finds the pair $\langle D_R, RFID_R \rangle$ such that $d \in D_R$ and $id \in RFID_R$ (316, FIG. 5). The system then attaches the labor data with John's employment relation R (217, FIG. 5).

While the invention has been described in terms of representative embodiments, those skilled in the art will recognize that the invention can be practiced with modification within the spirit and scope of the appended claims.

What I claim is:

1. A labor monitoring and payroll accounting method comprising the steps of:
   using a system comprising one or more servers configured to register users, wherein users are employers, employees, and their trusted agents, registration including employment relations between employers and employees and additional information that facilitates payroll computation and other functions of the system;
   assigning by an employer one or more local identification records (LIRs) to each of his/her employees, an employee's LIR uniquely identifying an employee for a given employer at an instant of time;
   using a labor monitoring device (LMD) to monitor actual labor activities of an employee, the LMD containing one or more Device Identification Records (DIRs);
   associating by an employer to an employment relation R a pair of $\langle L_R, D_R \rangle$, wherein $L_R$ is a subset of LIRs assigned to the employee of employment relation R, $D_R$ is a subset of the DIRs of the LMDs that monitor the employee, and there is no other employment relation R' such that $L_R \cap L_{R'} \neq \emptyset$ and $D_R \cap D_{R'} \neq \emptyset$;
   sending by the employee to a LMD a LIR l, where l is one of his/her LIRs;
   sending to the system by the LMD data representing a measurement of labor activities by the employee, the LIR l received from the employee, and the LMD's DIR d;
   identifying by the system the employment relation R by searching for a $\langle L_R, D_R \rangle$ such that $l \in L_R$ and $d \in D_R$; and
   accruing by the system labor data and preparing payroll reports based on the employment relation R identified by the system.

2. The labor monitoring and payroll accounting method of claim 1, further comprising the step of assigning a Global Identification (GID) to each registered user.

3. The labor monitoring an payroll accounting method of claim 1, wherein the LMD uses its geological location as its Device Identification Record (DIR), and the set of DIRs $D_R$ associated with the employment relation R is a predetermined geological area where the LMD operates.

4. The labor monitoring and payroll accounting method of claim 1, wherein said LMD sends to the system the following data, through one or more servers configured to communicate with the LMD:
   i. labor data representing a measurement of labor activities,
   ii. device identification record (DIR) d of the LMD, and
   iii. the LIR provided by the employee;
the method further comprising the steps of:
   identifying by the system a pair of $(D_R, L_R)$, where $D_R$ is a set of Device Identification Records (DIRs) of Labor Monitoring Devices (LMDs) and $L_R$ is a subset of LIRs assigned to the employee, such that $d \in D_R$ and $l \in L_R$, where l is the LIR obtained from the employee, and d is the LMD's own DIR;
   associating by the system received labor data with the employment relation R;
   validating by the system a user's access privilege to labor data using employment-relation-based rules; and
   delivering by the system requested labor data to an authorized user.

5. The labor monitoring and payroll method of claim 4, wherein the step of validating a user's access privilege to the labor data further comprises the steps of:
   prior to the access validation, creating by an employer or his trusted agents a data access rule for employment relations involving the employer, the employment-relation-based data access rule determining whether a user can access labor data associated with an employment relation;
   identifying by the system the employment relation associated with the said labor data; and
   determining by the system whether the said user can access labor data associated with the said employment relation.

6. The labor monitoring and payroll accounting method of claim 1, wherein the LMD includes a geographic location unit, the method further comprising the steps of:

after registering an employment relation R, associating by an employer $\langle G_R, L_R \rangle$ with R, where $G_R$ is a geological range of a LMD that monitors the employee's labor activity, and $L_R$ is a subset of LIRs assigned to the employee; and after receiving labor data, geographic location g of a LMD, and an employee's LIR l, identifying by the system a pair $(G_R, L_R)$ such that $g \in G_R$ and $l \in L_R$, where l is the LIR obtained from the employee.

7. A labor monitoring and payroll accounting method comprising the steps of:

registering users with the labor monitoring and payroll accounting (LMPA) system using one or more servers configured for user registration, wherein users are employers, employees, and their trusted agents;

registering by an employer or his trusted agent with the LMPA system an employment relation between the employer and an employee, the employment relation containing payroll information that facilitates payroll computation and other functions of the system;

registering a local identification record (LIR) for the said employment relation and giving the LIR to the said employee for use with the said employment relation;

registering by the employer or his trusted agent a device identification record (DIR) with a labor monitoring device (LMD);

monitoring labor activities of the said employee using the said LMD, the said LMD obtaining from the said employee his LIR for the employment relation under which labor activities occur;

sending to the LMPA system by the said LMD the following data, through one of more servers configured to communicate with LMDs:

i) labor data representing a measurement of the said labor activities, ii) a device identification record (DIR) that can relate the said LMD to the employer operating it, and iii) the LIR provided by the said employee to the LMPA system identifying the employer operating the said LMD using the received DIR, identifying the employer operating the said LMD using the received LIR;

associating the labor data with the said employment relation;

accruing the labor data and preparing payroll reports for employment relations inquired by a user; and accessing a payroll report by the said user through one or more servers configured to provide controlled data access.

8. The method of claim 7, wherein the system assigns a global identification number to the said user during the user registration.

9. The method of claim 7, wherein the step of accessing a payroll report further comprises the steps of:

requesting a payroll report by the user;

determining the user's access privilege to the payroll report;

if the user has access privilege to the payroll report, generating the report; and delivering the said report to a user's device through a communication channel.

10. The method of claim 9, wherein the step of determining the user's access privilege to a payroll report comprises the steps of:

identifying labor data required by the payroll report;

identifying employment relations to which the labor data is attached; and determining the user's access privilege based on the user's association with the employment relations.

11. The method of claim 7, further comprising the steps of:

assigning to the employee the said employer or his trusted agent a personal identification device (PID); and storing the LIR of the said employer for use with the said employment relation, the PID comprising a physical media storing the LIR, and the LMD is equipped with a communication component capable of reading the LIR from the said physical media.

12. The method of claim 11, wherein the said physical media is an electronic circuit storing the LIR, and the LMD has a communication component capable of reading the LIR from the said electronic circuit.

13. The method of claim 12, wherein the personal identification device (PID) is a Radio Frequency Identification device (RFID), and the local identification record (LIR) is the identification code of the RFID.

14. The method of claim 7, wherein the LIR of the said employee is a combination of digits and the employee may enter the combination of digits through an electronic interface provided by a LMD.

15. The method if claim 7, wherein the LIR contains a biologic measurement of the said employee and the LMD contains an electronic device capable of reading the biologic measurement of the said employee.

16. The method of claim 7, wherein the said LMD has a device identification number (LMD/ID) unique in the LMPA system and the device identification record sent by the said LMD to the system contains LMD/ID, the method further comprising the steps of:

before using a LMD to monitor labor activity, registering by the employer or his trusted agent operating the LMD the LMD/ID with the system;

storing by the system the association between the employer and the LMD/ID; and after receiving the data from a LMD, identifying by the system the employer operating the LMD using the LMD/ID received from the LMD.

17. The method of claim 7, wherein the DIR sent by a LMD is a geographic location of the LMD, the method further comprising the steps of:

before using a LMD to monitor labor activity, registering with the system by an employer some predetermined geographic areas in which the employer is the only employer operating the LMD; and after receiving the geographic location of a LMD, identifying by the system the employer operating the LMD by relating the geographic location to the predetermined geographic area registered by the employer.

18. A computer system for facilitating the collection, accruing, and distributed access of labor activity data under many-to-many employment relations, comprising: a persistent data storage configured to store:

a plurality of user account data including user identification data and payroll data, a plurality of employment relation records with the reference to employers' user accounts, employees' user accounts, and a plurality of labor data with the reference to employment relations;

a data acquisition server configured to receive labor data generated by a device measuring labor activities;

a web server configured to receive a user's request for accessing labor data and deliver the views of the labor data to the user, if the user is authorized to access these data;

a data process server configured to process labor data and generate different views and reports of the labor data;

a registration server configured to register users;

a plurality of labor monitoring devices configured to measure labor activities and transmit to a data acquisition server:

i) labor data representing a measurement of the labor activities, ii) a device identification record (DIR) that can relate the LMD to the employer operating it, and iii) a LIR (Local Identification Record) provided by the employee to the computing system identifying the employer operating the LMD using the received DIR, wherein the servers may operate on a cluster of interconnected computing devices or operate concurrently on the same computer hardware.

19. The system of claim 18, further comprising a personal identification device (PID) that can store the local identification record (LIR) of an employment relation and transmit to a labor monitoring device (LMD) the LIR.

20. The system of claim 19, wherein the PID includes a physical media storing the LIR and the LMD includes a communication component capable of reading the LIR from the physical media.

21. The system of claim 20, wherein the physical media is a Radio Frequency Identification (RFID) device and the LIR is the identification code of the RFID.

22. The system of claim 20, wherein the LMD includes an electronic interface and the LIR of the employee is a combination of digits which the employee enters through the electronic interface.

23. The system of claim 21, wherein a labor monitoring device has a means for computing geological location of the device, the said labor monitoring device sending its geological location in lieu of its device identification record.

24. The system of claim 18, wherein a labor monitoring device includes a means for enabling an employee to enter a local identification record linked to an employment relation.

25. The system of claim 18, wherein a labor monitoring device includes a means for measuring a distinctive physical feature of an employee, the labor monitoring device using the measurement data in lieu of local identification records.

* * * * *